United States Patent
Nordlund et al.

(10) Patent No.: US 8,842,122 B2
(45) Date of Patent: Sep. 23, 2014

(54) GRAPHICS PROCESSING UNIT WITH COMMAND PROCESSOR

(75) Inventors: Petri Olavi Nordlund, Lieto (FI); Jukka-Pekka Arvo, Raisio (FI); Robert J. Simpson, Espoo (FI)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 13/327,069

(22) Filed: Dec. 15, 2011

(65) Prior Publication Data
US 2013/0155080 A1 Jun. 20, 2013

(51) Int. Cl.
| G06T 1/00 | (2006.01) |
| G06T 15/00 | (2011.01) |
| G06F 15/16 | (2006.01) |
| G06F 15/80 | (2006.01) |

(52) U.S. Cl.
USPC ............................ 345/522; 345/502; 345/505

(58) Field of Classification Search
None
See application file for complete search history.

(56) References Cited

U.S. PATENT DOCUMENTS

| 7,583,268 | B2 | 9/2009 | Huang et al. | |
| 2008/0189524 | A1* | 8/2008 | Poon et al. | 712/221 |
| 2010/0262979 | A1* | 10/2010 | Borchers et al. | 719/321 |
| 2010/0295852 | A1 | 11/2010 | Yang et al. | |
| 2011/0050713 | A1 | 3/2011 | McCrary et al. | |
| 2011/0057931 | A1 | 3/2011 | Goel et al. | |
| 2011/0063311 | A1 | 3/2011 | McCrary et al. | |
| 2012/0192201 | A1* | 7/2012 | Sander et al. | 718/105 |
| 2012/0320070 | A1* | 12/2012 | Arvo | 345/522 |
| 2013/0151787 | A1* | 6/2013 | Riguer et al. | 711/137 |

OTHER PUBLICATIONS

Bautin et al., "Graphic Engine Resource Management," Multimedia Computing and Networking 2008, vol. 6818, 12 pp.
Guevara et al., "Enabling Task Parallelism in the CUDA Scheduler," 2009, XP002693219, Retrieved from the Internet: URL://www.cs.virginia.edu/kim/docs/pmea09.pdf, 8 pp.
International Search Report and Written Opinion—PCT/US2012/066079—ISA/EPO, dated Mar. 15, 2013, 12 pp.
NVIDIA, "NVIDIA's Next Generation CUDA Compute Architecture," Internet, 2009, XP002693218, Retrieved from the Internet: URL://http://www.nvidia.com/content/PDF/fermi_white_papers/NVIDIA_Fermi_Compute_Architecture_Whitepaper.pdf, pp. 1-22.
Second Written Opinion from corresponding PCT Application Serial No. PCT/US2012/066079 dated Mar. 18, 2014 (6 pages).
International Preliminary Report on Patentability—PCT/US2012/066079—The International Bureau of WIPO Geneva, Switzerland, Jun. 5, 2014, 8 pp.

* cited by examiner

Primary Examiner — Joni Richer
Assistant Examiner — Yi Wang
(74) Attorney, Agent, or Firm — Shumaker & Sieffert, P.A.

(57) ABSTRACT

Aspects of the disclosure relate to a method of controlling a graphics processing unit. In an example, the method includes receiving one or more tasks from a host processor, and scheduling, independently from the host processor, the one or more tasks to be selectively executed by a shader processor and one or more fixed function hardware units, wherein the shader processor is configured to execute a plurality of instructions in parallel, and the one or more fixed function hardware units are configured to render graphics data.

24 Claims, 5 Drawing Sheets

GRAPHICS PROCESSING UNIT WITH COMMAND PROCESSOR

TECHNICAL FIELD

Aspects of the disclosure relate to graphics processing.

BACKGROUND

Graphics processing units (GPUs) are commonly implemented to render three-dimensional (3D) graphics content for presentation on a two-dimensional visual display. For example, a GPU may be implemented to render pixels that are representative of 3D content on a display. The GPU may perform graphics processing to generate pixel values for each pixel of the display when rendering a scene.

Some GPUs may render an entire scene at one time. Alternatively, a GPU may render graphics in smaller portions of a scene, often referred to as "tiles" of a scene. For example, a GPU may subdivide a scene into a plurality of tiles, and individually render each of the tiles. The GPU may then reconstruct the scene by combining each of the rendered tiles. Tiles may be sized so that the data associated with a particular tile can be stored in local GPU memory resources during rendering.

SUMMARY

In general, this disclosure describes techniques for controlling a graphics processing unit (GPU). More specifically, this disclosure describes techniques for managing resources of a GPU using an integrated processing unit. That is, for example, rather than receiving a command stream from a CPU that dictates how the resources of a GPU are to be utilized, the integrated processing unit of the GPU may receive computational tasks that generally define work that is to be performed by the GPU. The integrated processing unit of the GPU may then determine how the tasks are executed by the resources of the GPU. For example, the integrated processing unit of the GPU may receive a task and independently schedule the task to a specific GPU resource, thereby controlling the resource of the GPU that executes the task.

In an example, a graphics processing unit comprises a shader processor, one or more fixed function hardware units, and a command processor. The shader processor is configured to execute a plurality of instructions in parallel. The one or more fixed function hardware units are configured to render graphics data. The command processor unit is configured to receive one or more tasks from a host processor and independently schedule the one or more tasks to be selectively executed by the shader processor and the one or more fixed function hardware units.

In another example, a method for controlling a graphics processing unit comprises receiving one or more tasks from a host processor, and scheduling, independently from the host processor, the one or more tasks to be selectively executed by a shader processor and one or more fixed function hardware units, wherein the shader processor is configured to execute a plurality of instructions in parallel, and the one or more fixed function hardware units are configured to render graphics data.

In another example, an apparatus for controlling a graphics processing unit comprises means for receiving one or more tasks from a host processor, and means for scheduling, independently from the host processor, the one or more tasks to be selectively executed by a shader processor and one or more fixed function hardware units, wherein the shader processor is configured to execute a plurality of instructions in parallel, and the one or more fixed function hardware units are configured to render graphics data.

In another example, a computer program product comprising a computer-readable medium comprising stored thereon instructions that, when executed, cause one or more processors to receive one or more tasks from a host processor, and schedule, independently from the host processor, the one or more tasks to be selectively executed by a shader processor and one or more fixed function hardware units, wherein the shader processor is configured to execute a plurality of instructions in parallel, and the one or more fixed function hardware units are configured to render graphics data.

The details of one or more aspects of the disclosure are set forth in the accompanying drawings and the description below. Other features, objects, and advantages of the disclosure will be apparent from the description and drawings, and from the claims.

DETAILED DESCRIPTION

In general, this disclosure describes techniques for controlling a graphics processing unit (GPU). More specifically, this disclosure describes techniques for managing resources of a GPU using an integrated processing unit. That is, for example, rather than receiving a command stream from a CPU that dictates how the resources of a GPU are to be utilized, the integrated processing unit of the GPU may receive computational tasks that generally define work that is to be performed by the GPU. The integrated processing unit of the GPU may then determine how the tasks are executed by the resources of the GPU. For example, the integrated processing unit of the GPU may receive a task and independently schedule the task to a specific GPU resource, thereby controlling the resource of the GPU that executes the task.

Figure 1:
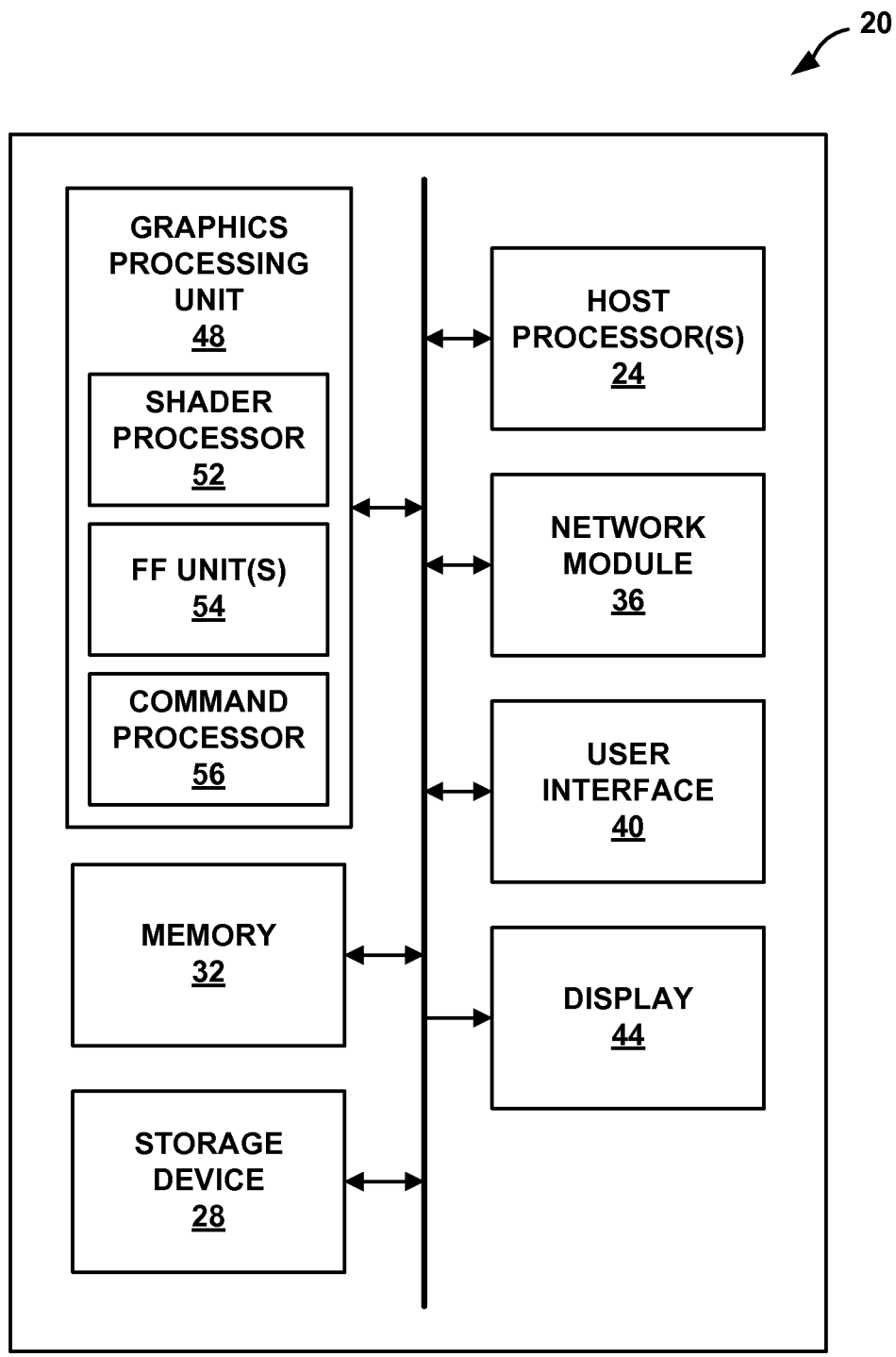
FIG. 1 is a block diagram illustrating a computing device having a graphics processing unit that may implement the techniques of this disclosure.

FIG. 1 is a block diagram illustrating a computing device 20 that may implement techniques for managing resources of a GPU, according to aspects of the disclosure. As shown in FIG. 1, computing device 20 includes a host processor 24, a storage device 28, a memory 32, a network module 36, a user interface 40, and a display 44. Computing device 20 also includes a graphics processing unit (GPU) 48 having one or more shader processors 52, one or more fixed function units 54, and a command processor 56. Computing device 20 may, in some examples, include or be a part of a portable or mobile computing device (e.g. mobile phone, netbook, laptop, tablet device, digital media player, gaming device, or other portable computing device). Alternatively, computing device 20 may be configured as a stationary computing device, such as desktop computer, server, television, television set-top box, gaming console, or the like.

The illustrated computing device 20 of FIG. 1 is merely one example. Techniques for managing resources of a GPU, such as GPU 48, may be carried out by a variety of other computing devices having other components. In some examples, computing device 20 may include additional components not shown in FIG. 1 for purposes of clarity. For example, computing device 20 may include one or more communication bridges for transferring data between components of the computing device 20. Moreover, the components of computing device 20 shown in FIG. 1 may not be necessary in every example of computing device 20. For example, user interface 40 and display 44 may be external to computing device 20 in examples where computing device 20 is a desktop computer.

Host processor 24 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to host processor 24, in this disclosure, may be embodied as software, firmware, hardware or any combination thereof.

Host processor 24 processes instructions for execution within computing device 20. Host processor 24 may be capable of processing instructions stored on storage device 28 or instructions stored in memory 32. The host processor 24 may generate a command stream using a driver (e.g., which may be implemented in software executed by the host processor 24) for execution by GPU 48. That is, host processor 24 may generate a command stream that defines operations to be performed by GPU 48.

Host processor 24 may generate a command stream to be executed by GPU 48 that causes viewable content to be displayed on display 44. For example, host processor 24 may generate a command stream that provides instructions for GPU 48 to render graphics data. In this example, host processor 24 may generate a command stream that is executed by a graphics rendering pipeline, such as the pipeline shown and described with respect to FIG. 2.

Additionally or alternatively, host processor 24 may generate a command stream to be executed by GPU 48 that causes GPU 48 to perform other operations. For example, in some instances, host processor 24 may generate a command stream for using GPU 48 as a general purpose graphics processing unit (GPGPU). For example, GPU 48 may carry out a variety of general purpose computing functions traditionally carried out by host processor 24. Examples include a variety of image processing functions, including video decoding and post processing (e.g., de-blocking, noise reduction, color correction, and the like) and other application specific image processing functions (e.g., facial detection/recognition, pattern recognition, wavelet transforms, and the like). In some examples, GPU 48 may collaborate with host processor 24 to execute such GPGPU applications. For example, host processor 24 may offload certain functions to GPU 48 by providing GPU 48 with a command stream for execution by GPU 48.

Storage device 28 may include one or more computer-readable storage media. Storage device 28 may be configured for long-term storage of information. In some examples, storage device 28 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. Storage device 28 may, in some examples, be considered a non-transitory storage medium. The term "non-transitory" may indicate that the storage medium is not embodied in a carrier wave or a propagated signal. However, the term "non-transitory" should not be interpreted to mean that storage device 28 is non-movable. As one example, storage device 28 may be removed from computing device 20, and moved to another device. As another example, a storage device, substantially similar to storage device 28, may be inserted into computing device 20. Storage device 28 may store instructions for execution of one or more applications by host processor 24 or GPU 48.

Memory 32 may be configured to store information within computing device 20 during operation. In some examples, memory 32 is a temporary memory, meaning that a primary purpose of memory 32 is not long-term storage. Memory 32 may, in some examples, be described as a computer-readable storage medium. Accordingly, memory 32 may also be considered "non-transitory," despite storing data that can change over time. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art.

In some examples, memory 32 may be used to store program instructions for execution by host processor 24 or GPU 48. Memory 32 may be used by software or applications running on computing device 20 to temporarily store information during program execution. As such, memory 32 may be accessed by other components of computing device 20 such as host processor 24 and GPU 48.

According to some aspects of the disclosure, memory 32 may be implemented as a display buffer that stores pixel data (e.g., a frame of video data, a computer-generated graphics image, a still image, and the like) before the data is displayed by display 44. For example, GPU 48 may resolve pixel data to memory 32 before the pixel data is displayed by display 44.

Computing device 20 may utilize network module 36 to communicate with external devices via one or more networks, such as one or more wireless networks. Network module 36 may be a network interface card, such as an Ethernet card, an optical transceiver, a radio frequency transceiver, or any other type of device that can send and receive information. In some examples, computing device 20 may utilize network module 36 to wirelessly communicate with an external device such as a server, mobile phone, or other networked computing device.

Computing device 20 also includes user interface 40. Examples of user interface 40 include, but are not limited to, a trackball, a mouse, a keyboard, and other types of input devices. User interface 40 may also include a touch-sensitive screen that is incorporated as a part of display 44. Display 44 may comprise a liquid crystal display (LCD), an organic light emitting diode (OLED) display, a plasma display, or another type of display device.

GPU 48 of computing device 20 may be a dedicated hardware unit having fixed function and programmable components for rendering graphics and executing GPGPU applications. For example, according to the example shown in FIG. 1, GPU 48 includes a programmable shader processor 52, fixed function units 54 (which may include fixed function hardware components), and command processor 56. GPU 48 may also include a DSP, a general purpose microprocessor, an ASIC, an FPGA, or other equivalent integrated or discrete logic circuitry. GPU 48 may also include other components, such as a dedicated GPU memory, as described in greater detail with respect to FIGS. 3-4.

In addition, although shown as separate components in FIG. 1, in some examples, GPU 48 may be formed as part of host processor 24. GPU 48 may be configured to utilize processing techniques in accordance with a variety of application programming interfaces (APIs). For example, a user may program an application to be executed by GPU 48 using a standard software interface that can run on multiple platforms, operating systems, and hardware.

In some examples, GPU 48 may be configured to utilize applications generated using the OpenGL platform, including OpenGL for Embedded Systems ("OpenGL ES," released March, 2007 and publicly available). Other example APIs include Compute Unified Device Architecture ("CUDA" developed by NVIDIA Corporation, version 3.2 released Sep. 17, 2010) and DirectX (developed by Microsoft, Inc., version 11 released Oct. 27, 2009). In general, an API includes a predetermined, standardized set of commands that are executed by associated hardware. API commands allow a user to instruct hardware components of a GPU to execute commands without user knowledge as to the specifics of the hardware components.

Figure 2:
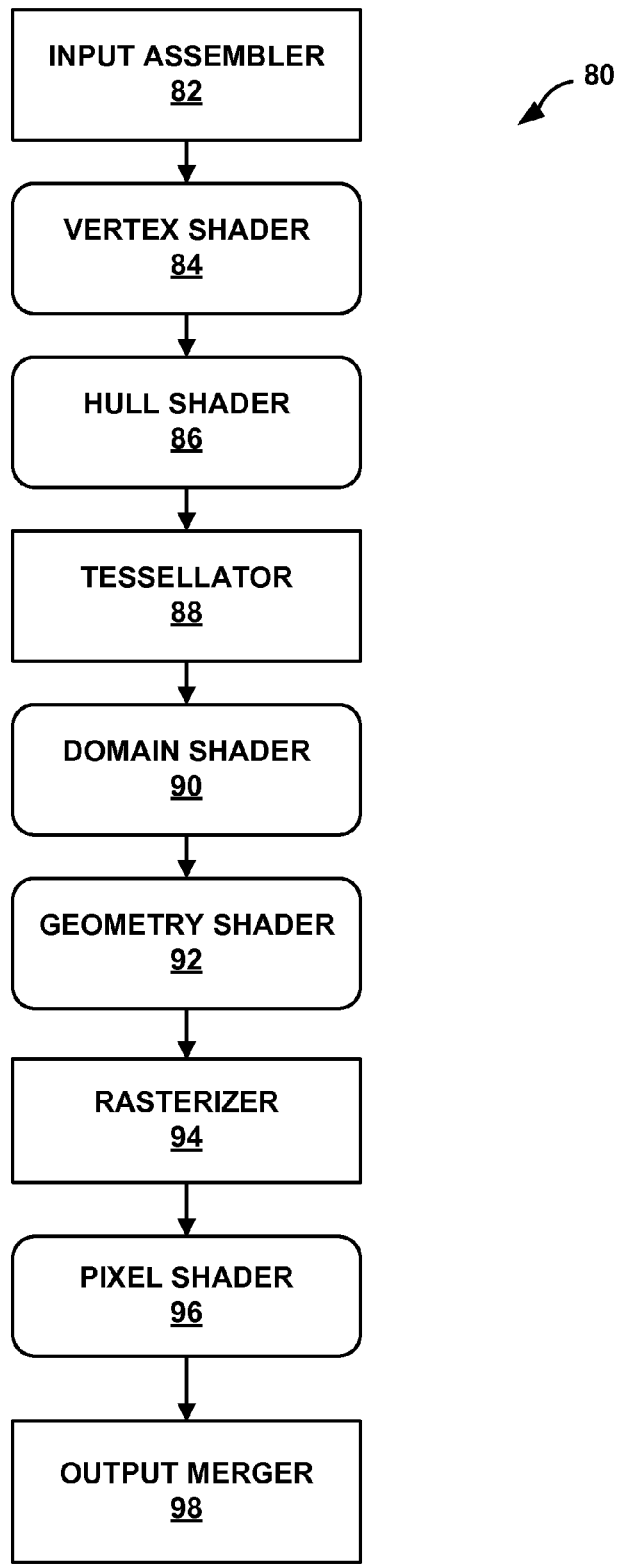
FIG. 2 is a block diagram illustrating an example graphics rendering pipeline.

While example of FIG. 1 shows shader processor 52 as a single block, shader processor 52 may include one or more shader processing units, and may generally be referred to as a "unified shader processor." That is, for example, shader processor 52 may perform geometry, vertex, pixel, or other shading operations (such as those described with respect to the shader stages shown in the example of FIG. 2) to render graphics. In another example, shader processor 52 may perform general purpose calculations. That is, shader processor 52 may execute instructions associated with a GPGPU application. A GPGPU application typically includes one or more kernels, which define functions that can be used to analyze or modify a variety of input data. Examples include functions for processing relatively large numerical data sets in parallel. In an image processing context, functions may include, for example, color correction algorithms, face detection algorithms, or functions for carrying out augmented reality applications. Other examples include transform functions, functions for ray tracing, or a variety of other functions.

Shader processor 52 may generally be configured to execute a plurality of instructions in parallel. For example, shader processor 52 may include an array of processing units (e.g., such as arithmetic logic units ("ALUs")) that execute instructions in parallel. Accordingly, shader processor 52 may include a one or more components not specifically shown in FIG. 3, such as components for fetching and decoding instructions, components for load balancing, and one or more ALUs or other computational units for carrying out calculations. Shader processor 52 may also include one or more memories, caches, or registers (e.g., such as shader processor memory 60 shown and described with respect to the example of FIG. 3).

Fixed function units 54 may include one or more units, such as fixed function hardware components, for rendering graphics data. For example, fixed function units 54 may include units for performing an initial input assembly of graphics data to prepare the graphics data (triangles, lines and points) for rendering. In another example, fixed function units 54 may include units for performing rasterization. That is, fixed function units 54 may prepare primitives for shading during rasterization. Fixed function units 54 may also perform a variety of other operations associated with rendering graphics data and/or performing other operations.

As noted above, GPU 48 may render graphics for display on display 44. For example, GPU 48 may use shader processor 52 and/or fixed function units 54 to perform the operations associated with the stages of a graphics rendering pipeline, such as the example pipeline shown in FIG. 2. According to some aspects of the disclosure, GPU 48 may implement a tile-based rendering architecture. For example, rather than rendering an entire scene of pixel data (e.g., a frame of video data, a computer-generated graphics image, a still image, and the like), GPU 48 may break a scene into multiple pieces (e.g., "tiles"), and individually render the tiles. The GPU 48 may write each of the rendered tiles to a buffer, such as a display buffer included in memory 32. Upon writing all of the tiles of the scene to memory 32, computing device 20 may assemble the rendered tiles and display the scene on display 44.

When implemented as a GPGPU, GPU 48 may execute shader programs, referred to herein as kernels. For example, as described in greater detail with respect to FIG. 3, shader processor 52 may execute kernels to perform a variety of general purpose computing functions, such as image processing functions and other functions. A kernel can be defined by a user using an API, such as the example APIs described above. Kernels may comprise individual work items (e.g., a basic unit of work in a GPU) that are grouped into workgroups. In some examples, GPU 48 may execute kernels in a particular sequence when executing a GPGPU command stream. That is, shader processor 52 may execute multiple instances of the same kernel in parallel before moving on to the next kernel. In other examples, GPU 48 may execute multiple kernels simultaneously.

In general, as noted above, GPU 48 receives a command stream from a host processor, such as host processor 24. The command stream is typically generated by a software driver being executed by host processor 24, and controls the operation of shader processor 52 and fixed function units 54. For example, the command stream typically controls which components of GPU 48 perform the operations defined in the command stream.

Due to constraints imposed by the configuration of some GPUs and the limitations of a command stream, a GPU, such as GPU 48, may typically execute a single task at a time. For example, GPU 48 may serially execute each operation included in a command stream. Thus, certain resources of GPU 48 may be idle while others are processing instructions according to the command stream. That is, shader processor 52 of GPU 48 may execute an operation according to a command stream while the fixed function units 54 sit idle.

In some examples, multitasking may be emulated by host processor 24 by switching between more than one command stream at suitable times. Command stream switching, however, may be relatively time intensive and may make it difficult to efficiently share GPU resources to carry out multiple tasks. For example, there may be relatively high latency associated with switching from one command stream to another. Accordingly, it may not be efficient to switch between various rendering operations and other operations, such as general purpose operations (e.g., image processing, ray tracing, or the like). In addition, it may not be efficient to assign high-priority, time-critical tasks (e.g., multimedia processing tasks such as audio processing) to GPU 48 via a command stream, due to uncertainty regarding when the task will be executed. For example, the time of execution of operations included in a command stream may be difficult to determine and may vary significantly depending on existing commands being executed by GPU 48.

According to aspects of the disclosure, command processor 56 may locally control the GPU resources without intervention by a host processor, such as host processor 24 or another host processing unit (e.g., a central processing unit (CPU)). For example, according to aspects of this disclosure, command processor 56 of GPU 48 may receive one or more "tasks" from host processor 24. Command processor 56 may independently schedule the tasks to be executed by the resources of GPU 48, including, for example, shader processor 52 and fixed function units 54. That is, rather than receiving a command stream from host processor 24 that dictates how GPU resources are utilized, command processor 56 may receive one or more higher level tasks that generally define work that is to be performed by the GPU. Such tasks may define operations that are to be performed by GPU 48 without dictating which resources of GPU 48 are to be used to perform the operations.

Command processor 56 may independently determine when to execute the tasks and/or which resources to execute the tasks. That is, aspects of this disclosure may refer to command processor 56 independently determining when to execute the tasks and/or which resources to execute the tasks, which may generally refer to the ability of command processor 56 to control the execution of tasks without intervention from host processor 24 (e.g., without intervention provided from, for example, a command stream generated by host processor 24). As described in greater detail below, such determinations may be made based on resource availability and/or task priority, among other potential considerations. Command processor 56 may also independently control the data flow between the various resources of GPU 48.

Command processor 56 may simultaneously control multiple tasks, including independently and selectively distributing tasks to different resources of GPU 48, such as shader processor 52 and/or fixed function units 54. That is, command processor 56 may control the execution of tasks without intervention from host processor 24, and select which resources of GPU 48 execute each task without all resources of GPU 48 necessarily dedicated to executing a single task. In example, command processor 56 may schedule a graphics rendering task to be executed by fixed function units 54 of GPU 48, while also selectively scheduling a computational task to be simultaneously executed by shader processor 52 of GPU 48. In this way, command processor 56 may enable GPU 48 to execute multiple tasks in parallel, without having to wait for host processor 24 to switch command streams. Rather, host processor 24 can send a plurality of tasks to command processor 56, and command processor 56 can control the execution of the tasks.

The ability of GPU 48 to locally control GPU resources without intervention by host processor 24 may provide increased flexibility and promote efficient management of GPU resources. For example, as described above, host processor 24 traditionally transmits a command stream to GPU 48, which GPU 48 sequentially executes using the resources of GPU 48 in a pipeline fashion. A single operation is typically performed by GPU 48 at a given time, such that some resources of the GPU may be idle while waiting for other resources to finish executing a particular command stream. That is, in an example for purposes of illustration, certain fixed function units 54 may be performing graphics rendering operations while shader processor 52 sits idle.

According to aspects of this disclosure, command processor 56 may increase efficiency by reducing an amount of time that resources of GPU 48 are idle. For example, rather than treating GPU resources as an interconnected series of components that may only process one command stream at a time, command processor 56 may individually and selectively control the resources of GPU 48. In the example provided above, command processor 56 may schedule a graphics rendering task to fixed function units 54 of GPU 48, while also scheduling a different, computational task to shader processor 52 of GPU 48. Accordingly, command processor 56 potentially reduces the amount of time that GPU resources are idle by selectively scheduling tasks to different resources of GPU 48, rather than having all of the resources of GPU 48 execute one task at a time.

FIG. 2 illustrates a graphics rendering pipeline 80. In general, graphics rendering pipeline 80 may be used for rendering graphics with a GPU, such as GPU 48 (FIG. 1). It should be understood that pipeline 80 is provided merely for purposes of explanation and fewer, additional, or alternative stages may be included in pipeline 80.

Graphics rendering pipeline 80 generally includes programmable stages (e.g., illustrated with rounded corners) and fixed function stages (e.g., illustrated with squared corners). For example, graphics rendering operations associated with certain stages of graphics rendering pipeline 80 are generally performed by a programmable shader processor, such as shader processor 52, while other graphics rendering operations associated with other stages of graphics rendering pipeline 80 are generally preformed by non-programmable, fixed function hardware units, such as fixed function units 54. Graphics rendering stages performed by shader processor 52 may generally be referred to as "programmable" stages, while stages performed by fixed function units 54 may generally be referred to as fixed function stages.

Input assembler stage 82 is shown in the example of FIG. 2 as a fixed function stage and is generally responsible for supplying graphics data (triangles, lines and points) to the graphics rendering pipeline 80. For example, input assembler stage 82 may collect vertex data for high order surfaces, primitives, and the like, and output vertex data and attributes to vertex shader stage 84.

The vertex shader stage 84 may process the received vertex data and attributes. For example, vertex shader stage 84 may perform per-vertex processing such as transformations, skinning, vertex displacement, and calculating per-vertex material attributes. In some examples, vertex shader stage 84 may generate texture coordinates, vertex color, vertex lighting, fog factors, and the like. Vertex shader stage 84 generally takes a single input vertex and outputs a single, processed output vertex.

The process of tessellation may generally be performed by the hull shader stage 86, the tessellator stage 88, and the domain shader stage 90. For example, the hull shader stage 86 may generate tessellation factors to pass to the tessellator stage 88. In an example, the hull shader stage 86 may transform input data that defines a low-order surface into control points that make up a patch. A patch may include data for each of a plurality of nodes that together specify certain properties (e.g., such as geometry) for a relatively small portion of a surface of an object. The tessellator stage 88 may be a fixed-function stage that uses the tessellation factors from the hull shader stage 86 to tessellate (or subdivide) a patch into multiple triangle or quad primitives. Each vertex resulting from the tessellator stage 88 may be output to the domain shader stage 90. The domain shader stage 90 may evaluate the surface representation at each vertex. The domain shader stage 90 may send complete data for each vertex (e.g., position, texture coordinates, etc.) to the geometry shader 92.

The geometry shader stage 92 may receive a primitive defined by the vertex data (e.g., three vertices for a triangle, two vertices for a line, or a single vertex for a point) and further process the primitive. For example, the geometry shader stage 92 may perform per-primitive processing such as silhouette-edge detection and shadow volume extrusion, among other possible processing operations.

The rasterizer stage 94 is typically a fixed function stage that is responsible for clipping primitives and preparing primitives for the pixel shader stage 96. For example, the rasterizer stage 94 may generate a number of fragments for shading by pixel shader 96. The pixel shader stage 96 receives fragments from the rasterizer stage 94 and generates per-pixel data such as color. The pixel shader stage 96 may also perform per-pixel processing such as texture blending and lighting model computation. The output merger stage 98 is generally responsible for combining various types of output data (such as pixel shader values, depth and stencil information) to generate a final result.

As noted above, graphics rendering pipeline 80 generally includes programmable stages (e.g., illustrated with rounded corners) and fixed function stages (e.g., illustrated with squared corners). Accordingly, some of the stages of graphics rendering pipeline 80 are typically performed by programmable components, such as a shader processor (e.g., shader processor 52 shown in the example of FIG. 1), while other stages of graphics rendering pipeline 80 are typically performed by non-programmable, fixed function hardware units (e.g., fixed function units 54 shown in the example of FIG. 1).

According to aspects of this disclosure, a command processor (e.g., command processor 56 shown in the example of FIG. 1) may be used to independently control each of the stages of graphics rendering pipeline 80. For example, rather than data being sequentially processed by each stage of pipeline 80, according to aspects of this disclosure, command processor 56 may independently control the stages of pipeline 80. That is, command processor 56 may distribute a first computational task to input assembler 82, and distribute a second computational task to one of the shader stages (which uses shader processor 52). In this example, the second computational task is routed through or executed by input assembler 82, as would normally occur in pipeline processing. Accordingly, input assembler 82 may be performing a graphics rendering function, while shader processor 52 is executing another task (such as a GPGPU operation).

Figure 3:
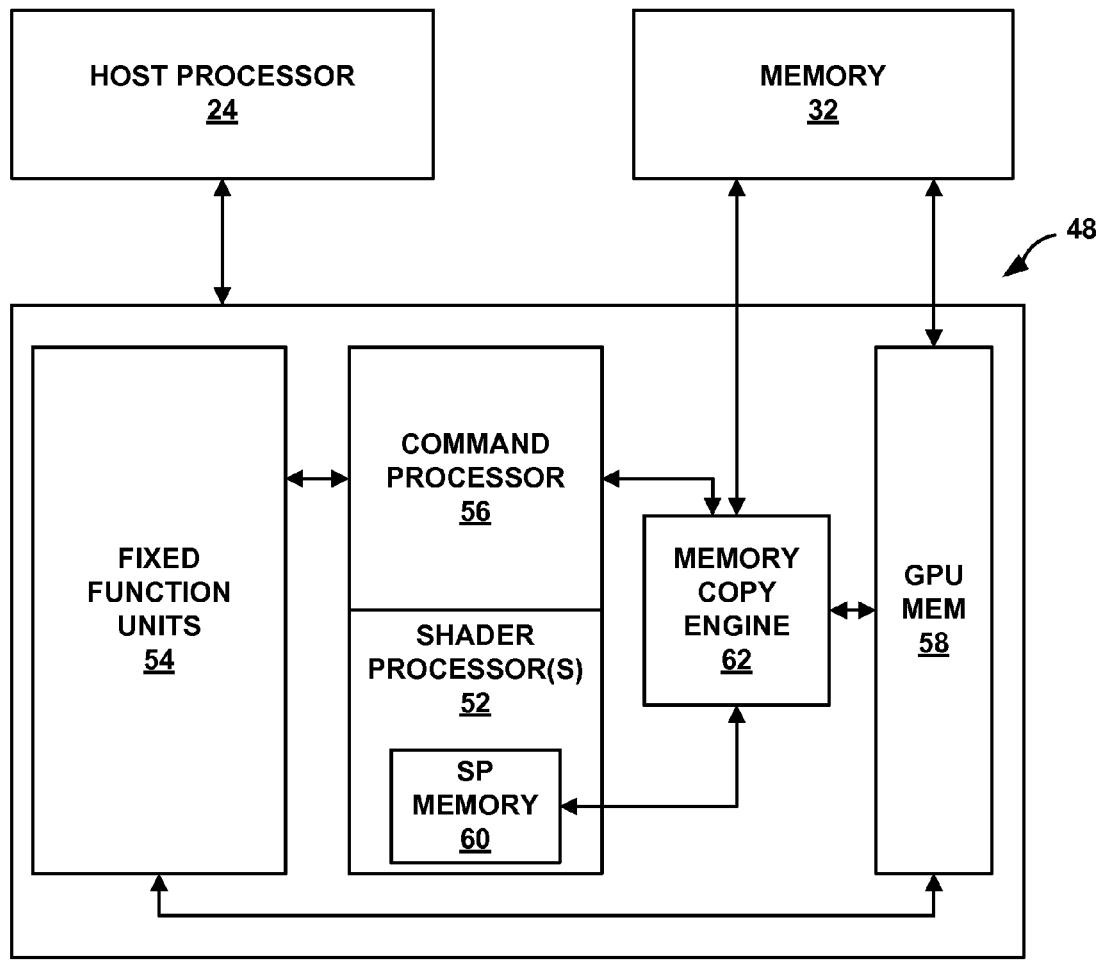
FIG. 3 is a block diagram illustrating the graphics processing unit of the example shown in FIG. 1 in greater detail.

FIG. 3 is a block diagram illustrating GPU 48 in greater detail, which may be implemented to carry out the techniques of this disclosure. In the example shown in FIG. 3, GPU 48 includes shader processor 52, fixed function units 54, and command processor 56. In addition, in the example shown in FIG. 3, GPU includes shader processor memory 60 (which is shown as being incorporated with shader processor 52) and a memory copy engine 62. It should be understood that certain modules and/or units of FIG. 3 may be highly integrated, but are illustrated separately for conceptual purposes. Moreover, the certain modules may be described with respect to a single module for conceptual purposes, but may include one or more functional and/or structural units.

It should also be understood that FIG. 3 is provided as merely one example of a GPU that can utilize techniques the described in this disclosure. The techniques described with respect to this disclosure may be carried out by a variety of other GPUs having other components. That is, in other examples, GPU 48 may also include a variety of other components and modules related to rendering images, analyzing images, and/or performing other calculations. For example, GPU 48 may include texture units, scheduling units, arithmetic logic units (ALUs), or other GPU components not shown in FIG. 3 for purposes of clarity.

As noted with respect to the example of FIG. 1 above, shader processor 52 may include one or more shader processing units that may perform graphics rendering and/or other general purpose operations. That is, for example, shader processor 52 may perform geometry, vertex, pixel, or other shading operations to render graphics. In other examples, shader processor 52 may perform general purpose calculations.

Fixed function units 54 may generally include one or more units, such as fixed function hardware components, for rendering graphics data. For example, fixed function units 54 may include units for performing an initial input assembly of graphics data to prepare the graphics data (triangles, lines and points) for rendering. In another example, fixed function units 54 may include units for performing rasterization. That is, fixed function units 54 may prepare primitives for shading during rasterization. Fixed function units 54 may also perform a variety of other operations associated with rendering graphics data and/or performing other operations.

Command processor 56 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to command processor 56 may, in some examples, be embodied as software, firmware, hardware or any combination thereof. While shown command processor 56 is shown as a separate unit from shader processor 52, in some examples, command processor 56 may be integrated with shader processor 52.

As noted above with respect to FIG. 1, command processor 56 may locally control the GPU resources without intervention by host processor 24 or other processing unit. For example, according to aspects of this disclosure, command processor 56 of GPU 48 may receive one or more "tasks" from host processor 24. Command processor 56 may independently schedule the tasks to be executed by the resources of GPU 48, including, for example, shader processor 52 and fixed function units 54. That is, rather than receiving a command stream from host processor 24 that dictates how GPU resources are utilized, command processor 56 may receive one or more higher level tasks that generally define work that is to be performed by the GPU. Such tasks may define operations that are to be performed by GPU 48 without dictating which resources of GPU 48 are to be used to perform the operations. GPU 48 may independently determine when to execute the tasks and/or which resources to execute the tasks.

GPU memory 58 may be is similar to memory 32 shown in FIG. 1. That is, in some examples, GPU memory 58 may be a temporary computer-readable storage medium. Examples of GPU memory 58 include random access memories (RAM), dynamic random access memories (DRAM), static random access memories (SRAM), and other forms of registers and memories known in the art. In examples where GPU 48 is formed as part of another processor, such as host processor 24, GPU memory 58 may be accessed by components other than GPU 48. Typically, GPU memory 58 stores data that is used in operations performed by GPU 48. In some examples, GPU memory 58 may receive data from another memory unit, such as memory 32 of computing device 20. That is, computing device 20 may transfer data from memory 32 to GPU memory 58 so that the data is accessible to GPU 48.

In the example shown in FIG. 3, shader processor 52 includes shader processor memory 60 ("SP memory"). As described in greater detail below with respect to memory copy engine 62, data may be exchanged between SP memory 60 and GPU memory 58. For example, SP memory 60 may receive and store unprocessed data for execution by shader processor 52 from GPU memory 58. That is, SP memory 60 may store data prior to the data being processed, for example, by ALUs of shader processor 52. In addition, SP memory may store processed data prior to transferring the processed data to GPU memory 58. SP memory 60 may be accessed relatively quickly by units within shader processor 52. However, data transfer between SP memory 60 and GPU memory 58 may consume one or more clock cycles during which shader processor 52 may not process other data.

According to aspects of this disclosure, GPU 48 also includes memory copy engine 62, which is in communication with one or more memory units of GPU 48. For example, as shown in FIG. 3, memory copy engine 62 may be in communication with memory 32, GPU memory 58, and/SP memory 60. In some examples, memory copy engine 62 may facilitate data transfer between memory 32 (e.g., a system memory) and SP memory 60. For example, according to aspects of this disclosure, memory copy engine 62 may receive instructions from command processor 56 that identify data to transfer between memory 32 and SP memory 60 (and vice versa). In addition, memory copy engine 62 may receive instructions from command processor 56 that identify when to transfer data between memory 32 and SP memory 60 (and vice versa). Upon receiving the instructions from command processor 56, memory copy engine 62 may carry out the data transfer between memory 32 and SP memory 60. In other examples, memory copy engine 62 may also be responsible for data transfer between other memory units of GPU 48, such as between GPU memory 58 and SP memory 60.

In some examples, according to aspects of this disclosure, certain units of GPU 48 (e.g., such as shader processor 52, SP memory 60, memory 32, and/or GPU memory 58) may be "unaware" of the operations of memory copy engine 62. That is, memory copy engine 62 may operate independently of the units to which data is being copied to and copied from. In an example for purposes of illustration, rather than shader processor 52 copying data from memory 32 to SP memory 60 (and using the associated resources and clock cycles to facilitate the data transfer), such a data transfer may be handled by memory copy engine 62. That is, memory copy engine 62 may copy the data from memory 32 to SP memory 60 for use by shader processor 52. Accordingly, shader processor 52 may utilize the data stored in SP memory 60 without waiting for data to be transferred between SP memory 60 and memory 32. In this way, memory copy engine 62 may provide shader processor 52 with a data as needed, and shader processor 52 can continue to perform operations on the data without utilizing clock cycles for data transfer. For example, command processor 56 may synchronize memory copy engine 62 with the tasks being scheduled by command processor 56, such that SP memory 60 is supplied with the appropriate data when executing a particular task. As noted above, memory copy engine 62 may also be responsible for transferring processed data between GPU memory 58 and SP memory 60. Additionally or alternatively, memory copy engine 62 may transfer data to and from fixed function units 54 and/or other components of GPU 48.

In operation, according to aspects of this disclosure, host processor 24 may generate a command stream that includes one or more tasks to be carried out by GPU 48. The tasks may set forth a variety of work that is to be done by GPU 48, such as performing graphics rendering and/or other general purpose operations. Command processor 56 of GPU 48 may receive the command stream and facilitate the execution of each of the tasks included in the command stream.

According to aspects of this disclosure, command processor 56 may initially parse the received command stream and identify each task that is to be performed by GPU 48. In addition to parsing the tasks from the command stream, command processor 56 may maintain a command queue for organizing each of the tasks to be executed by the components of GPU 48. For example, command processor 56 may schedule tasks to be executed by the components of GPU 48 (such as shader processor 52 and/or fixed function units 54) using the command queue. In some examples, the command queues may be fixed function hardware units (e.g., first in first out (FIFO) registers, or the like). In other examples, the command queues may be general memory or register units.

Command processor 56 may also maintain command queues for controlling other functions associated with GPU 48. For example, command processor 56 may maintain a command queue for organizing data exchange with a host processor (e.g., a central processing unit (CPU)). In other examples, command processor 56 may maintain a command queue for organizing data exchange with a digital signal processor (DSP) or other computing components, such as multimedia units.

In some examples, command processor 56 may schedule tasks based on an availability of GPU resources 48. For example, command processor 56 may schedule tasks based on input/output interfaces being available. In another example, command processor 56 may schedule tasks based on whether the data being executed is ready for processing. In another example, command processor 56 may schedule tasks based on whether space is available in memory (e.g., GPU memory 58) to store the result of the tasks.

According to some aspects of this disclosure, command processor 56 may prioritize the tasks in the command queues. In some examples, the component responsible for generating the task (e.g., host processor 24) may be responsible for indicating a priority with the task. In other examples, command processor 56 may determine priority based on the tasks that are included in the command queue. For example, command processor 56 may identify a task that is more time sensitive than other tasks in the command queue, and may prioritize the high priority task in the command queue such that the task is scheduled and executed prior to the other tasks.

In some examples, command processor 56 may also maintain a list of active tasks that are being executed by the components of GPU 48, as well as track the component responsible for executing the tasks. The active task list may be used, for example, to track the status of tasks. By tracking the status of tasks, command processor 56 may determine which resources of GPU 48 are available for scheduling tasks. That is, if a task is currently being executed by a GPU resource (e.g., the task is "active"), that resource may not be available until the active task is completed. In some examples, command processor 56 may be responsible for identifying which components of GPU 48 are actively executing tasks (e.g., by polling or otherwise determining that a component is busy). In other examples, command processor 56 may receive an indication that a particular task has been completed by the component responsible for executing the task, or by monitoring data being written to GPU memory 58.

In an example, command processor 52 may initiate the execution of a task by shader processor 52. Command processor 56 may then add the task to the list of active tasks that are being currently being executed by shader processor 52. Using the active task list, command processor 56 may track the resources that are currently executing tasks, while also identifying the available resources that are not currently executing tasks.

Using priority information and/or the list of active tasks, command processor 56 may preempt a task being executed by a component of GPU 48 if a higher priority task is added to the command queue and that higher priority task is ready to be executed (e.g., the data associated with the task is ready for execution). That is, command processor 56 may stop execution of a lower priority task in order to execute a higher priority task if the higher priority task is ready to be executed.

Command processor 56 may resume the lower priority task after completing execution of the higher priority task.

In this way, command processor 56 may independently distribute tasks to different resources of GPU 48, such as shader processor 52 and/or fixed function units 54 without intervention by a host processor. In example for purposes of illustration, computing device 20 including GPU 48 may be a digital camera (e.g., a mobile device that includes a digital camera). In this example, GPU 48 of the digital camera may be rendering images for display in a viewfinder. The user of the digital camera may select an image processing function to perform on the displayed images (e.g., image sharpening, noise reduction, and the like). GPU 48 may switch from rendering the images to performing the (general purpose) image processing functions. In this example, the switching between functions of GPU 48 may be independently facilitated by command processor 56.

The ability of GPU 48 to locally control GPU resources without intervention by host processor 24 may provide increased flexibility and promote efficient management of GPU resources. For example, according to aspects of this disclosure, command processor 56 may reduce an amount of time that resources of GPU 48 are idle. In the example provided above, command processor 56 may schedule a graphics rendering task to fixed function units 54 of GPU 48, while also scheduling a computational task to shader processor 52 of GPU 48. That is, for example, with respect to the digital camera example described above, command processor 56 may schedule graphics rendering task (e.g., rendering images for display in the viewfinder) while also scheduling a computational task (e.g., image processing). Accordingly, command processor 56 potentially reduces the amount of time that GPU resources are idle.

According to aspects of this disclosure, the "tasks" from host processor 24 may be defined by a user (e.g., an application developer) using an API. For example, as noted above, APIs such as DirectX and OpenGL allow a user to develop an application for rendering graphics or performing other operations with GPU 48. Traditional APIs, however, may be restricted to a fixed (e.g., pipelined) data flow, which may be suitable for one type of graphics rendering but may not efficiently accommodate other tasks (e.g., such as raytracing or raycasting). That is, applications developed using traditional APIs may route data sequentially through each stage of a rendering pipeline (such as graphics rendering pipeline 80 shown in the example of FIG. 2), regardless of whether each stage is needed to carry out a particular operation.

Aspects of this disclosure relate to an API that a user may apply to generate an application having relatively high level computational tasks. For example, the API may allow a user to define tasks that generally describe work that is to be performed by the GPU. That is, tasks may define operations that are to be performed by GPU 48 without dictating which resources of GPU 48 are to be used to perform the operations. In some examples, a variety of tasks may be included in an API and exposed to an application developer. Using the API, the application developer may generate an application that, when executed, utilizes a custom pipeline (e.g., relative to graphics pipelines of traditional APIs). In an example, an application developer may generate an application that uses a custom graphics pipeline that is optimized for performing particular rendering operations, such as raytracing or raycasting.

An API may not be needed, however, to perform the techniques of this disclosure. For example, according to some aspects, a complier (e.g., a compiler program, such as a C/C++ compiler) may map portions of program code to be executed by components of GPU 48. That is, the compiler may identify the appropriate components of GPU 48 to execute a given portion of program code, as well as specify a task that includes the given portion of code. The command processor 56 may then receive the mapped portions of code and schedule the tasks accordingly.

Figure 4:
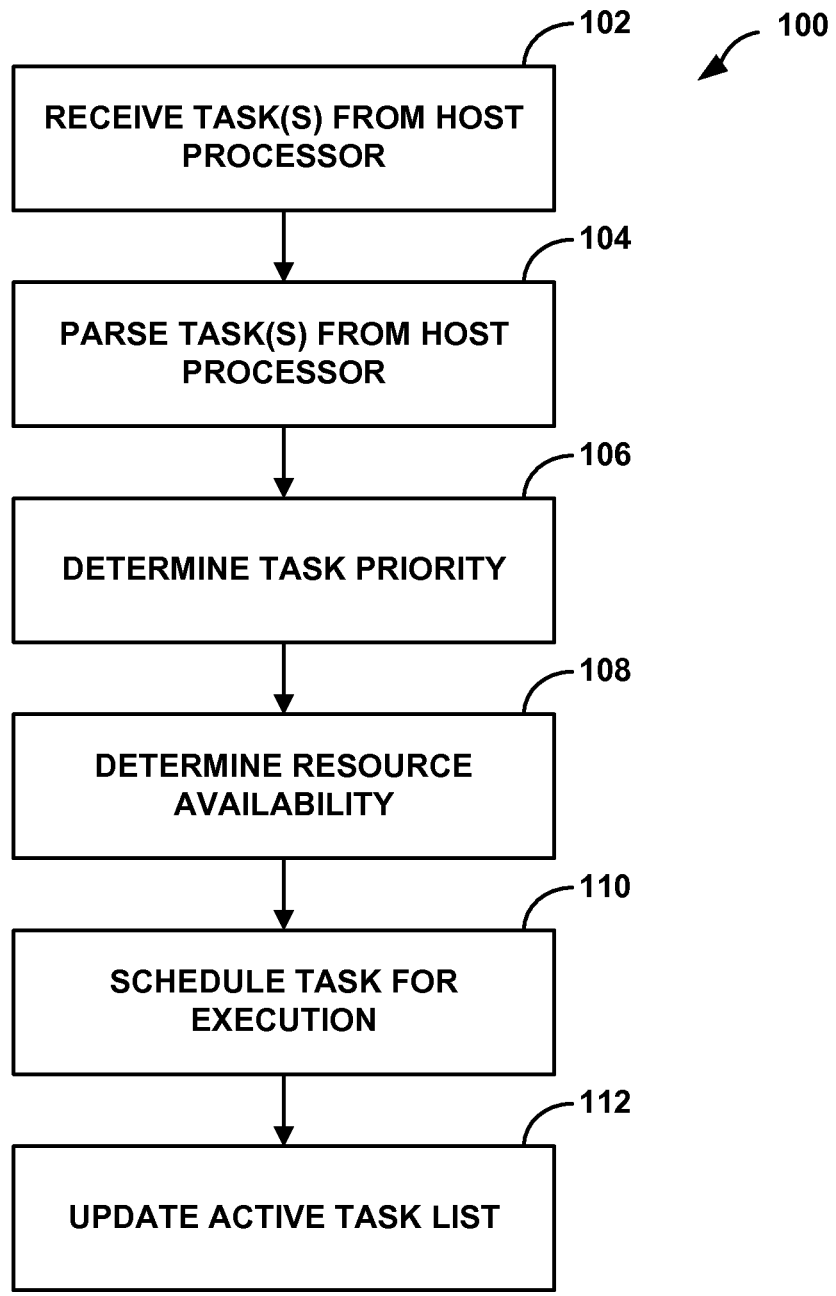
FIG. 4 is a flowchart illustrating an example operation of a command processor, according to aspects of the disclosure.

FIG. 4 is a flowchart illustrating an example method 100 that may be performed by a command processor, according to aspects of the disclosure. That is, for example, the method shown in FIG. 4 may be performed by command processor 56 shown in FIGS. 1 and 3. However, while the method in the example of FIG. 4 is described with respect to command processor 56, it should be understood that other graphics processing units of other computing devices may perform some or all of the functions attributed to command processor 56.

In the example method 100 of FIG. 4, command processor 56 initially receives one or more tasks, for example, from a host processor such as host processor 24 (102). For example, command processor 56 may receive a command processor that includes one or more tasks defining work to be performed by components of GPU 48. Command processor 56 may parse the command stream to identify each task included in the command stream (104).

Command processor 56 may also determine task priority (106). For example, according to some aspects of this disclosure, command processor 56 may maintain one or more command queues that may determine when each of the received tasks are to be executed by the components of GPU 48. Command processor 56 may organize the one or more command queues based on task priority, such that more critical and/or time sensitive tasks are executed prior to other tasks. In some examples, the component responsible for generating the task (e.g., host processor 24) may be responsible for indicating a priority with the task. In other examples, command processor 56 may determine priority based on the tasks that are included in the command queue.

Command processor 56 may also determine resource availability (108). For example, command processor 56 may determine whether the component(s) responsible for executing the task is available (e.g., not executing another task). Moreover, command processor 56 may determine whether the data associated with the task is available.

In addition to or instead of organizing the one or more command queues based on task priority, command processor 56 may organize the one or more command queues based on resource availability. That is, for example, command processor 56 may not schedule a task to be executed by a component of GPU 48 unless the component is available to execute the task. Moreover, command processor 56 may not schedule a task to be executed by a component of GPU 48 unless the data associated with the task is available. That is, command processor 56 may wait until the data associated with a particular task has been moved by memory copy engine 62 to SP memory 60 prior to scheduling the task for execution. Moreover, command processor 56 may ensure that the data associated with a particular task is not being modified by any other components of GPU 48 prior to scheduling the task.

Command processor 56 may then schedule a task for execution by one or more of the components of GPU 48 (110). In some examples, according to aspects of this disclosure, command processor 56 may independently manage tasks such that components of GPU 48 may be executing different tasks in parallel. For example, command processor 56 may schedule a task to be executed by shader processor 52 in parallel with a task to be executed by fixed function units 54.

Upon scheduling a task, command processor 56 may update a list of active tasks (112), i.e., an active task list. For example, command processor 56 may maintain a list of active tasks that are being executed by the components of GPU 48, as well as track the component responsible for executing the task. The active task list may be used, for example, to track the status of tasks. By tracking the status of tasks, command processor 56 may determine which resources of GPU 48 are available for scheduling tasks, and which resources of GPU 48 are busy executing tasks. That is, if a task is currently being executed by a GPU resource (e.g., the task is "active"), that resource may not be available until the active task is completed. In an example, after initiating execution of a task by shader processor 52, command processor 56 may add the task to the list of active tasks that are being currently being executed by shader processor 52. In some examples, command processor 56 may be responsible for identifying which components of GPU 48 are actively executing tasks (e.g., by polling or otherwise determining that a component is busy). In other examples, command processor 56 may receive an indication that a particular task has been completed by the component responsible for executing the task, or by monitoring data being written to GPU memory 58.

It should also be understood that the steps shown and described with respect to FIG. 4 are provided as merely one example. That is, the steps of the method of FIG. 4 need not necessarily be performed in the order shown in FIG. 4, and fewer, additional, or alternative steps may be performed. For example, FIG. 4 shows task priority being determined prior to determining resource availability. In another example, determining resource availability may be performed prior to determining task priority.

Figure 5:
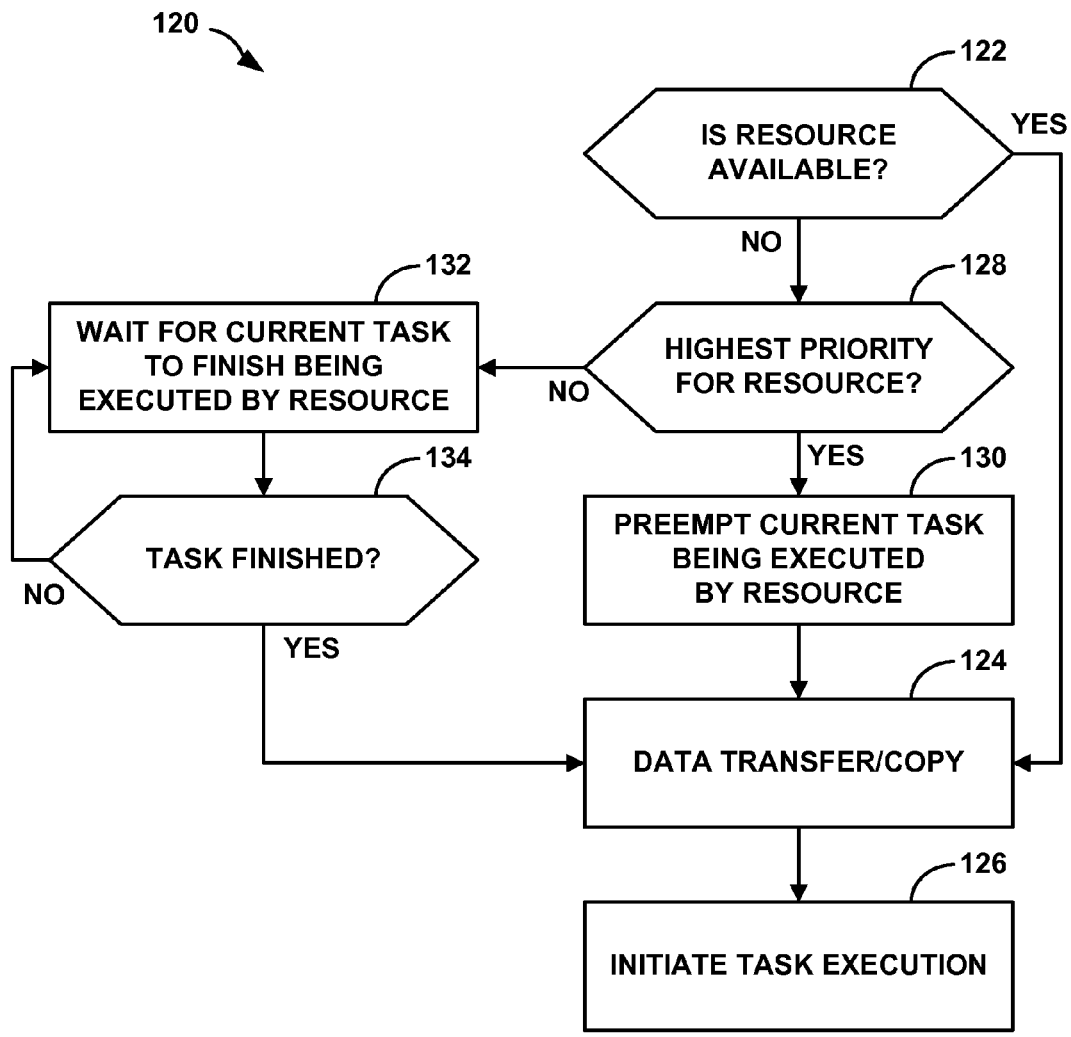
FIG. 5 is a flowchart illustrating another example operation of a command processor, according to aspects of the disclosure.

FIG. 5 is a flowchart illustrating an example method 120 that may be performed by a command processor, such as command processor 56, according to aspects of the disclosure. That is, for example, the method shown in FIG. 5 may be performed by command processor 56 shown in FIGS. 1 and 3. However, while the method shown in the example of FIG. 5 is described with respect to command processor 56, it should be understood that other graphics processing units of other computing devices may perform some or all of the functions attributed to command processor 56.

In some examples, the method 120 may be performed instead of, or in conjunction with, the method 100 shown in the example of FIG. 4. For example, the method shown in the example of FIG. 5 may be performed when scheduling a task for execution (e.g., step 110 shown in FIG. 4).

Command processor 56 initially determines whether one or more resources (e.g., including data, input/output interfaces, memory, and/or processing units) required to execute a current task are available (122). If the resources are available (the yes branch of step 122), command processor 56 may instruct data copy engine 62 to copy the appropriate data from GPU memory 58 to SP memory 60, if necessary (124). In addition, command processor 56 may initiate task execution (126). That is, command processor 56 may schedule the task to be executed by the appropriate component of GPU 48.

If the resources for executing the current task are not available (the no branch of step 122), command processor 56 may determine whether the current task is the highest priority task for the resources required to execute the task (128). If the current task is the highest priority task (the yes branch of step 128), command processor 56 may preempt the task currently being executed by the resources (130). That is, command processor 56 may interrupt operation of the resources required to execute the task so that the current task can be executed (e.g., GPU resources not required to execute the task may continue executing other tasks). After preempting the task currently being executed, command processor 56 may perform steps 124 and 126 to execute the current task, as described above. In some examples, the state of the preempted task may be stored (e.g., stored to GPU memory 58) to allow the task to be resumed after the current task has been executed.

If the current task is not the highest priority task for the resources required to execute the task (the no branch of step 128), command processor 56 may wait for the task currently being executed by the resources to finish executing (132). Upon the resources completing the task (the yes branch of step 134), command processor may execute the current task, for example, by performing steps 124 and 126 as described above.

It should also be understood that the steps shown and described with respect to FIG. 5 are provided as merely one example. That is, the steps of the method of FIG. 5 need not necessarily be performed in the order shown in FIG. 5, and fewer, additional, or alternative steps may be performed.

In addition, it should be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

Moreover, in one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A graphics processing unit comprising:
   a shader processor having an array of processing units configured to execute a plurality of instructions in parallel;
   one or more fixed function hardware units, separate from the array of processing units of the shader processor, wherein the one or more fixed function hardware units are configured to perform a graphics rendering operation not shader processor;
   and
   a command processor unit configured to receive one or more tasks from a host processor and independently schedule the one or more tasks based on a type of operation of each of the one or more tasks and a respective priority of the one or more tasks to be selectively executed by the shader processor and the one or more fixed function hardware units.

2. The graphics processing unit of claim 1, wherein the command processor is configured to maintain a command queue of the one or more tasks that are received, wherein the command queue comprises a list of tasks to be executed by the graphics processing unit.

3. The graphics processing unit of claim 1, wherein the command processor is configured to determine the respective priority of the one or more tasks and schedule the one or more tasks based on the respective priority of the one or more tasks.

4. The graphics processing unit of claim 1, wherein the command processor is configured to receive an indication of the respective priority of the one or more tasks from the host processor and schedule the one or more tasks based on the respective priority of the one or more tasks.

5. The graphics processing unit of claim 1, wherein the command processor is configured to maintain a list of active tasks, wherein an active task is a task that is currently being executed by at least one of the shader processor and the one or more fixed function hardware units.

6. The graphics processing unit of claim 1, wherein the command processor is configured to stop execution of a first task of the one or more tasks and begin execution of a second task of the one or more tasks.

7. The graphics processing unit of claim 1, further comprising a memory copy engine configured to copy data from a memory of the graphics processing unit to a memory of the shader processor.

8. The graphics processing unit of claim 7, wherein the command processor controls the operation of the memory copy engine.

9. The graphics processing unit of claim 1, wherein to independently schedule the one or more tasks based on the type of operation, the command processor unit is configured to determine whether the one or more tasks are associated with a graphics rendering operation or a general purpose operation.

10. A method for controlling a graphics processing unit comprising:
    receiving one or more tasks from a host processor; and
    scheduling, independently from the host processor, the one or more tasks to be selectively executed by a shader processor and one or more fixed function units based on a type of operation of each of the one or more tasks and a respective priority of the one or more tasks, wherein the shader processor includes an array of processing units configured to execute a plurality of instructions in parallel, and wherein the one or more fixed function hardware units are separate from the shader processor and configured to perform a graphics rendering operation not performed by the shader processor.

11. The method of claim 10, further comprising maintaining a command queue of the one or more tasks that are received, wherein the command queue comprises a list of tasks to be executed by the graphics processing unit.

12. The method of claim 10, further comprising maintaining a list of active tasks, wherein an active task is a task that is currently being executed by at least one of the shader processor and the one or more fixed function hardware units.

13. The method of claim 10, further comprising interrupting execution of a first task of the one or more tasks and beginning execution of a second task of the one or more tasks.

14. The method of claim 10, further comprising copying data from a memory of the graphics processing unit to a memory of the shader processor prior to execution of the one or more tasks.

15. An apparatus for controlling a graphics processing unit comprising:
    means for receiving one or more tasks from a host processor; and
    means for scheduling, independently from the host processor, the one or more tasks to be selectively executed by a shader processor and one or more fixed function units based on a type of operation of each of the one or more tasks and a respective priority of the one or more tasks, wherein the shader processor includes an array of processing units configured to execute a plurality of instructions in parallel, and wherein the one or more fixed function hardware units that are separate from the shader processor and configured to perform a graphics rendering operation not shader processor.

16. The apparatus of claim 15, further comprising means for maintaining a command queue of the one or more tasks that are received, wherein the command queue comprises a list of tasks to be executed by the graphics processing unit.

17. The apparatus of claim 15, further comprising means for maintaining a list of active tasks, wherein an active task is a task that is currently being executed by at least one of the shader processor and the one or more fixed function hardware units.

18. The apparatus of claim 15, further comprising means for interrupting execution of a first task of the one or more tasks and beginning execution of a second task of the one or more tasks.

19. The apparatus of claim 15, further comprising means for copying data from a memory of the graphics processing unit to a memory of the shader processor prior to execution of the one or more tasks.

20. A computer program product comprising a non-transitory computer-readable medium comprising stored thereon instructions that, when executed, cause one or more processors to:
receive one or more tasks from a host processor; and
schedule, independently from the host processor, the one or more tasks to be selectively executed by a shader processor and one or more fixed function units based on a type of operation of each of the one or more tasks and a respective priority of the one or more tasks, wherein the shader processor includes an array of processing units configured to execute a plurality of instructions in parallel, and wherein the one or more fixed function hardware units that are separate from the shader processor and configured to perform a graphics rendering operation not performed by the shader processor.

21. The computer program product of claim 20, further comprising instructions stored thereon instructions that, when executed, cause the one or more processors to maintain a command queue of the one or more tasks that are received, wherein the command queue comprises a list of tasks to be executed by the graphics processing unit.

22. The computer program product of claim 20, further comprising instructions stored thereon instructions that, when executed, cause the one or more processors to maintain a list of active tasks, wherein an active task is a task that is currently being executed by at least one of the shader processor and the one or more fixed function hardware units.

23. The computer program product of claim 20, further comprising instructions stored thereon instructions that, when executed, cause the one or more processors to interrupt execution of a first task of the one or more tasks and begin execution of a second task of the one or more tasks.

24. The computer program product of claim 20, further comprising instructions stored thereon instructions that, when executed, cause the one or more processors to copy data from a memory of the graphics processing unit to a memory of the shader processor prior to execution of the one or more tasks.

* * * * *

UNITED STATES PATENT AND TRADEMARK OFFICE
CERTIFICATE OF CORRECTION

PATENT NO. : 8,842,122 B2
APPLICATION NO. : 13/327069
DATED : September 23, 2014
INVENTOR(S) : Petri Olavi Nordlund et al.

Page 1 of 1

It is certified that error appears in the above-identified patent and that said Letters Patent is hereby corrected as shown below:

In the Claims

On column 17, line 45 (claim 1), "not shader processor;" should read --not performed by the shader processor;--

On column 18, line 67 (claim 15), "ing operation not shader processor." should read --ing operation not performed by the shader processor.--

Signed and Sealed this
Thirtieth Day of June, 2015

Michelle K. Lee
*Director of the United States Patent and Trademark Office*